United States Patent

Couderc et al.

[11] 4,072,861
[45] Feb. 7, 1978

[54] OPTICAL TRACKING SYSTEM

[75] Inventors: Georges Couderc; Claude Andre Payen; Jean Dansac; Leonidas Symaniec, all of Paris, France

[73] Assignee: Thomson-CSF, Paris, France

[21] Appl. No.: 407,443

[22] Filed: Oct. 18, 1973

Related U.S. Application Data

[63] Continuation-in-part of Ser. No. 203,186, Nov. 30, 1971, abandoned.

[30] Foreign Application Priority Data

Dec. 4, 1970 France ................................ 70.43739

[51] Int. Cl.$^2$ ........................ G01D 5/36; G06F 15/34; G06G 7/19
[52] U.S. Cl. ..................................... 250/233; 364/515
[58] Field of Search ................ 343/100 CL; 356/152; 324/77 K; 235/181; 250/233

[56] References Cited

U.S. PATENT DOCUMENTS

| | | | |
|---|---|---|---|
| 2,942,118 | 6/1960 | Gedance | 356/152 |
| 3,239,674 | 3/1966 | Aroyan | 356/152 |
| 3,355,579 | 11/1967 | Robertson | 343/100 CL |
| 3,441,724 | 4/1969 | Taylor, Jr. | 343/100 CL |
| 3,483,557 | 12/1969 | Skenderoff et al. | 343/100 CL |
| 3,526,893 | 9/1970 | Skenderoff et al. | 343/100 CL |
| 3,617,724 | 11/1971 | McCarthy | 235/181 |

FOREIGN PATENT DOCUMENTS 2,116,724    7/1972    France.

Primary Examiner—Eli Lieberman
Assistant Examiner—T. N. Grigsby
Attorney, Agent, or Firm—Karl F. Ross

[57] ABSTRACT

A light-emitting target within the field of view of an optical objective is focused within a generally rectangular detection area upon a continuously moving code carrier which is subdivided into a multiplicity of juxtaposed strip zones parallel to the direction of motion, each strip zone forming a pseudo-random binary optical code pattern recurring one or more times throughout its length. The motion of the code carrier generates a pulsed light beam which is intercepted by a photoelectric transducer unit and, after electric amplification, is reconverted by a photoemissive unit into a train of luminous pulsations projected onto the code carrier in a correlation area traversed at every instant by a code pattern identical with that of the detection area. The light gated by the matching code of the correlation area is focused upon the screeen of a camera tube which therefore receives a bright spot at a point whose location on the screen corresponds to that of the target image on the detection area. The transducer unit may comprise a set of linear detectors, aligned with respective strip zones, in which case the photoemissive unit has a like number of linear light emitters parallel to the direction of carrier motion. With a single detector receiving light from the entire detection area, feeding a single light emitter, the code patterns of the several strip zones are mutually distinct.

7 Claims, 3 Drawing Figures

OPTICAL TRACKING SYSTEM

CROSS-REFERENCE TO RELATED APPLICATIONS

This application is a continuation-in-part of our copending application Ser. No. 203,186, filed Nov. 30, 1971 and now abandoned.

FIELD OF THE INVENTION

The present invention relates to a system for tracking light-radiating objects.

BACKGROUND OF THE INVENTION

Such systems measure, with precision, the angular deviation of the direction of an intercepted target from the boresight axis of an optical tracker. When the target is mobile, such as aircraft or a winged or ballistic missile, the system follows the movement of the vehicle while maintaining optical contact in the infra-red, visible or ultra-violet light range. The optical field covered by a tracking objective is generally limited in the corresponding focal plane to a useful detection area of rectangular shape centered on the optical or boresight axis. Thus, there corresponds to each remote target in the field of observation, radiating light rays toward the system within a predetermined spectral band, a spot image in the detection area whose positioning with respect to the center of that area defines the off-boresight error. The cartesian co-ordinates of this point in the focal plane represent in this manner the spatial co-ordinates of the target corresponding to elevation and azimuth.

It is understood that the sighted target comprises a light source of continuous emission having a quasi-omnidirectional radiation pattern so as to enable easy acquisition by optical sight and continuous reception of a fraction of the power radiated toward the optical system whatever the angular off-boresight error in the tracking field.

A system of the type with which the present invention is concerned proceeds by scanning the useful area of the focal plane forming the image of the spatial field sighted by the optical device. Localization of the target in cartesian co-ordinates is obtained by dividing this rectangular useful area into a plurality of juxtaposed elementary strips each having the same length as a dimension of the image rectangle, for example the dimension considered as the abscissa axis (X). The combined width of these juxtaposed strips equals the other dimension of the useful area, i.e. the dimension along the axis of the ordinates (Y). Exploration of the useful area is effected by mechanical scanning means affording a high degree of resolution. According to known techniques, e.g. as disclosed in British Pat. No. 1,176,003, this mechanical scanning proceeds by sequentially moving a plurality of parallel slots in front of and close to the focal plane in a direction perpendicular to the principal dimension of the elementary strips.

A light-source-tracking device of this type enables, by using a linear array of rectangular detectors, a determination of a first spatial co-ordinate, such as the azimuth, by the rank of the excited detector and a second spatial co-ordinate, the elevation in this case, by analysis of the time of occurrence of the detected signal which is time-modulated by the scanning slots. Determination of these spatial co-ordinates is effected by electronic processing.

The performance of such a system is particularly satisfactory from the point of view of filtering out parasitic light sources (sun, clouds, etc...) which are usually of larger dimensions than the detected target. There results therefrom a great improvement of the useful signal-to-noise ratio, the noise being formed essentially by continuous (d-c) components and variable signals due to parasitic sources. However, this technique of operation has its optimum performance limited by the fact that an increase in frequency selectivity of the treatment circuits diminishes not only the noise but also the accuracy of measuring the abscissa (X) of the target whereas a decrease in selectivity has the opposite effect.

OBJECT OF THE INVENTION

The object of our present invention is to provide an improved optical tracking system of this general type, operating with noncoherent light and in real time.

SUMMARY OF THE INVENTION

In accordance with this invention we provide a continuously moving code carrier such as an endless film strip or a partly transparent disk which is subdivided into a multiplicity of juxtaposed strip zones parallel to the direction of motion, each strip zone forming a pseudo-random binary optical code pattern and at least one replica thereof following one another in the longitudinal direction of the strip. The code carrier, located substantially in the focal plane of the tracking objective, thus modulates the continuous luminous radiation from a light-emitting distant target within the field of view so as to generate, within the detection area defined by the tracking objective, a pulsed light beam which is converted, advantageously by photoelectric conversion means and with intervening electrical amplification, into a train of luminous pulsations in the same rhythm or cadence which are projected onto the code carrier in a correlation area whose center is spaced from that of the detection area by a whole number of lengths of the longitudinally coextensive recurrent code patterns of the several strip zones whereby the two areas are traversed by correlated patterns at each instant. The light of these pulsations, gated by a matching code in the correlation area, is focused upon a receiving surface where it produces a bright spot at a point whose location with reference to the center of that surface corresponds to that of the target image in the detection area. The deviation of this bright spot from the center, known as the off-boresight error, can be determined in cartesian co-ordinates by conventional scanning means if the receiving surface is the screen of a camera tube.

The term "replica" connotes either an identical pattern or a complementary one; in the latter case the electrical signals can be inverted to provide an equivalent output.

As more fully described hereinafter, the pulsed light beam from the detection area can be intercepted by a photoelectric transducer unit which may comprise either a set of linear detectors, aligned with respective strip zones in that area, or a single detector receiving light from the entire area. In the first instance, the luminous pulsations projected upon the correlation area are generated by a like number of linear light emitters parallel to the direction of carrier motion; in the second instance, in which a single light emitter can be used to illuminate the whole correlation area, the code patterns of the several strip zones must be mutually distinct for unequivocal correlation and pinpointing of the target.

The strip zones may be concentric rings of a rotatable disk serving as the code carrier.

BRIEF DESCRIPTION OF THE DRAWING

The invention will now be described with particular reference to the accompanying drawing, wherein.

SPECIFIC DESCRIPTION

Figure 3:
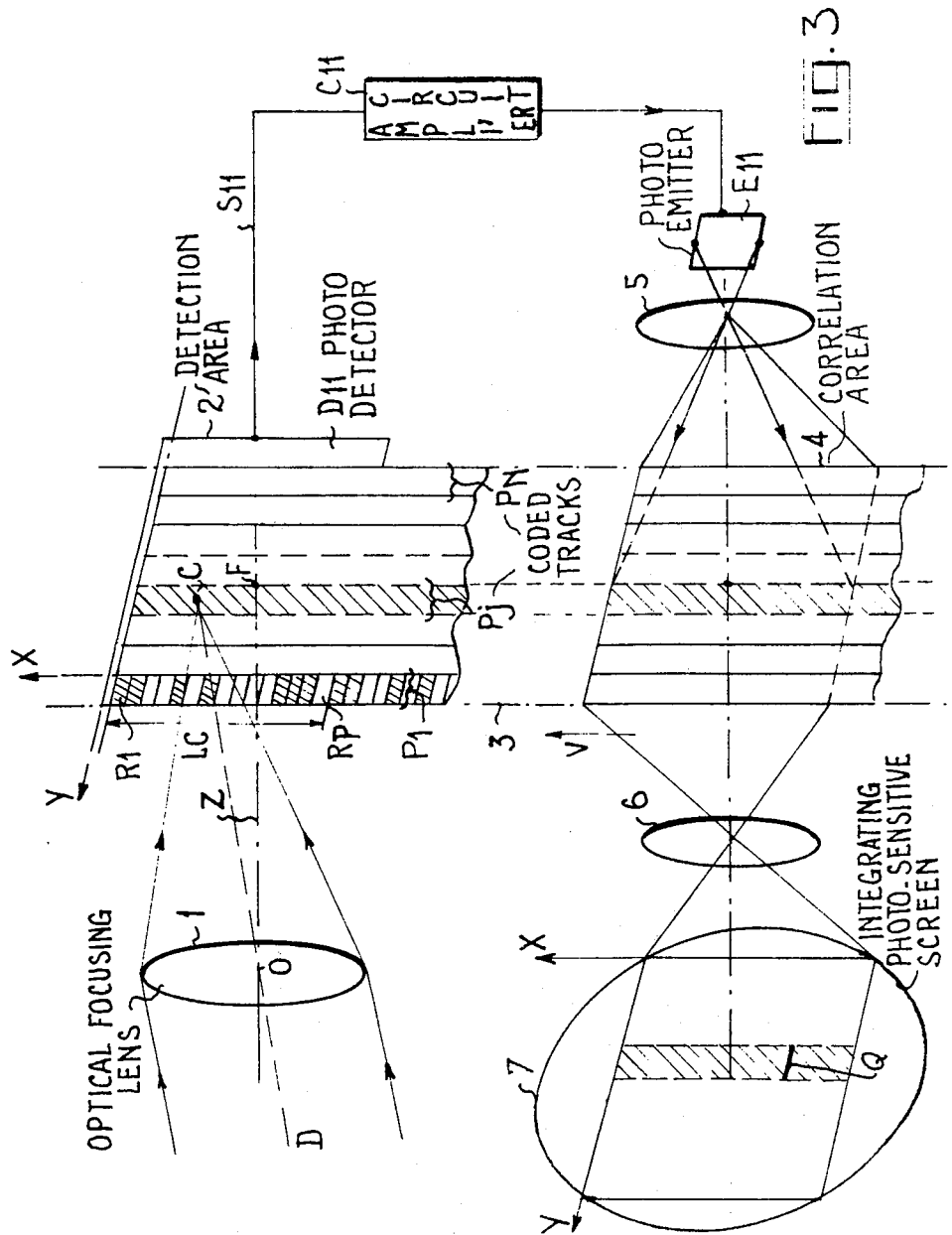
FIG. 3 schematically shows another embodiment of a tracking system according to the invention.

The direct measure of one of the spatial co-ordinates of an intercepted target, e.g. the ordinate Y, with an angular resolution corresponding to the width of an elementary strip along this direction is obtained by a combination of detection means and scanning means, in a manner to produce a particular signal for each of the N channels corresponding to the total number N of elementary strips. Thus, as will appear hereinafter, these N strips may work into N channels treated separately (FIG. 1), or into a single channel undergoing N simultaneous treatments (FIG. 3).

Figure 1:
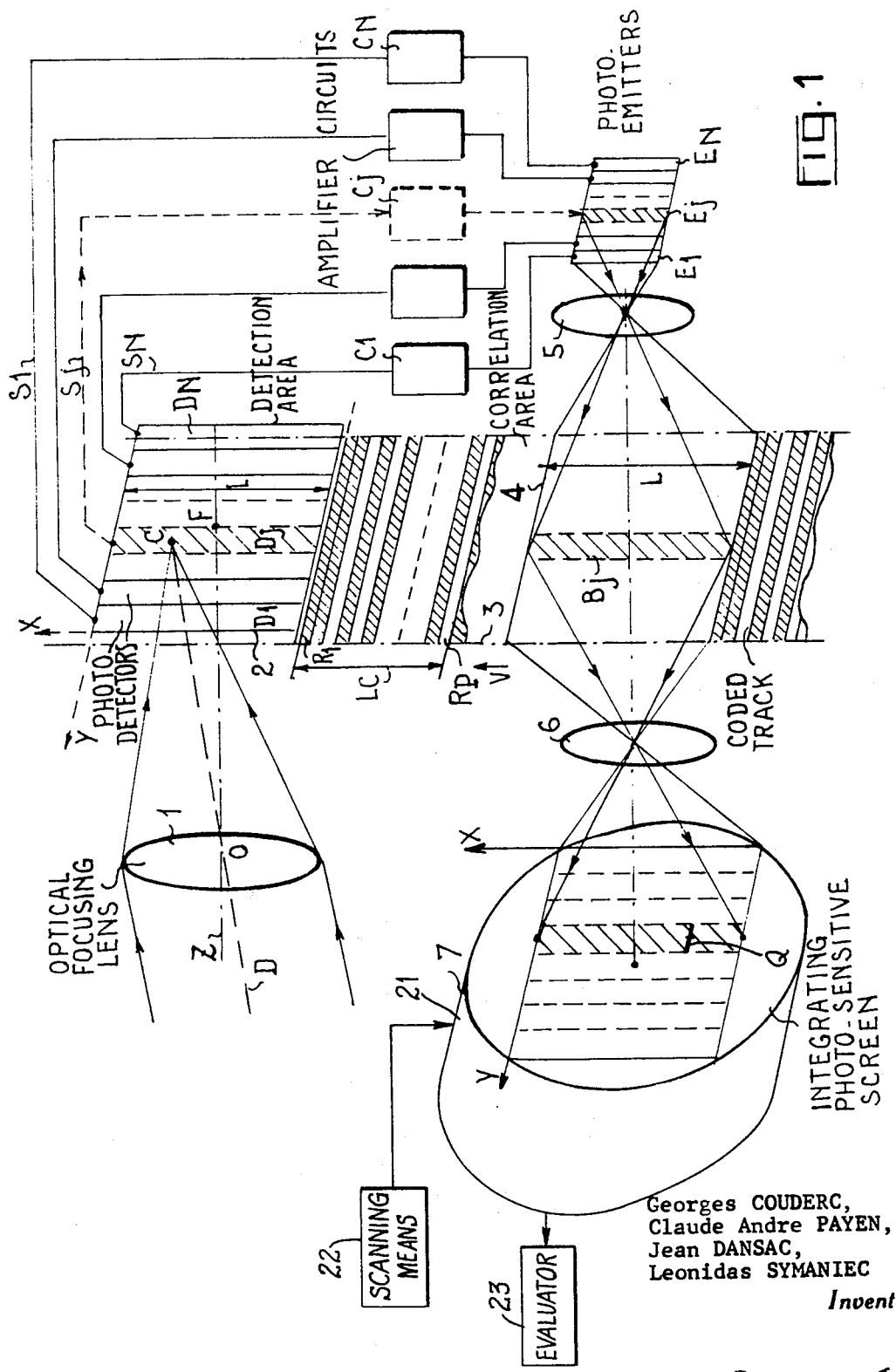
FIG. 1 schematically shows an embodiment of a tracking system according to our invention.

In FIG. 1 there is schematically shown a light-source-tracking system wherein the measure of a spatial co-ordinate of a sighted target, e.g. the ordinate Y corresponding to its azimuth, is obtained spatially according to known techniques by means of a linear array of rectangular photo-detectors $D_1$ to $D_N$ juxtaposed by their large sides parallel to the X axis or abscissa. The array is located in the focal plane of an optical focusing objective, constituting the input of the system, which is symbolized by an optical lens 1. The boresight axis Z of the system corresponds to the optical axis of this objective and is shown passing through the optical center 0 of the lens 1 and the image focus F. The rectangular useful area 2 of detection is coextensive with the array and defines a solid angle of sight corresponding to the field of view within which a light-radiating target may be detected. This latter is assumed positioned spatially on an off-boresight line D in the field, whence the fraction of light radiation emitted in the field of view is focused at C on a detector $D_j$. The rank $j$ of this detector enables a first spatial co-ordinate to be identified, corresponding to the azimuth in this example, with an accuracy or angular resolution related to the width (in the direction Y) of the detectors which is practically limited only by technological considerations.

Identification of the second spatial co-ordinate or elevation is effected by means of a mechanical scanning device intercepting the incoming light rays close to and in front of the focusing plane. This mechanical device is formed by a flat support 3, i.e. a film strip, which moves at the speed V in the direction X next to the focal plane and which comprises transparent slots or lines against a dark background. The lines are parallel to the Y axis, which is orthogonal to their movement, and have a length equal to the second dimension of the useful area 2. In a preferred embodiment of our invention (see FIG. 2), the support 3 is in the form of a rotating disk with photographically produced radial lines approximately satisfying the above requirements.

A succession of lines such as $R_1$ to $R_P$ is produced in the form of transparent and opaque zones reproducing spatially a pseudo-random binary code having $P = 2^n - 1$ bits; such a code translates optically, at the rate of one period per bit, into a sine wave pseudo-randomly time-modulated by phase inversion 0-$\pi$. Such a code can be produced in known manner by means of a shift register having $n$ stages and a feedback connection from the $n$th stage and an intermediate stage through a coincidence (e.g. EXCLUSIVE-OR) gate to the first stage. The lines, during movement at uniform speed V, produce individual time-modulation patterns of the detected signals, such as the signal $S_j$ corresponding to the element $D_j$, by interruption of the optical transmission received by this element at C. The size of a light or dark unit area, representing a bit of value 1 or 0, is determined by taking into account the desired accuracy of measurement in the X direction as well as the anticipated size of the image spot of an intercepted target.

A processor comprises an optical correlator, proceeding in real time with noncoherent light, which is fed by the N channels with the detected signals $S_1$ to $S_N$ after their reshaping and amplification in suitable circuits $C_1$ to $C_N$. Optical correlation is obtained with a reference signal reproducing with time and phase synchronism the modulation code. This reference signal is translated optically, in the same manner as the modulation code, on the same flat moving support 3, thus conferring to the correlation the necessary time synchronism. The correlator comprises a linear array of photo-emitter elements $E_1$ to $E_N$, followed by an optical component 5 forming the image 4 of that array on the reference plane. This assembly is so arranged that the image 4 extends along the axis X over a length L equal to that of the detection area 2 and with a distribution of the emissions of the uniform elements $E_1$ to $E_N$ duplicating the subdivision of area 2 into strip zones $D_1 - D_N$. Thus the element $E_j$ lights up in uniform manner, when it is excited by the corresponding signal $S_j$, a strip zone $B_j$ of the image area 4, the change in illumination of that zone reproducing the time modulation of the signal. A second optical component 6 behind support 3 projects the image of the correlation area 4 onto an integrating photosensitive receiving surface formed advantageously by the photosensitive screen 7 of a camera tube 21. Electronic scanning of that screen is effected line by line, by conventional means diagrammatically indicated at 22, along the Y axis with a scanning speed in the X direction corresponding to the speed V of displacement of the code carrier 3. The scan is kept in step with the recurrent code pattern with the aid of a synchronization track (12, FIG. 2) carried by the support 3. The video signal thus generated is applied to an evaluator 23 where the elevation and the azimuth of the intercepted target are determined by measuring the cartesian co-ordinates of the correlation peak appearing as a bright spot Q on the screen. The evaluator 23 includes N gate circuits enabling the video signal to be sampled in time intervals corresponding to the spacing of the N projected strip zones along the Y direction.

Figure 2:
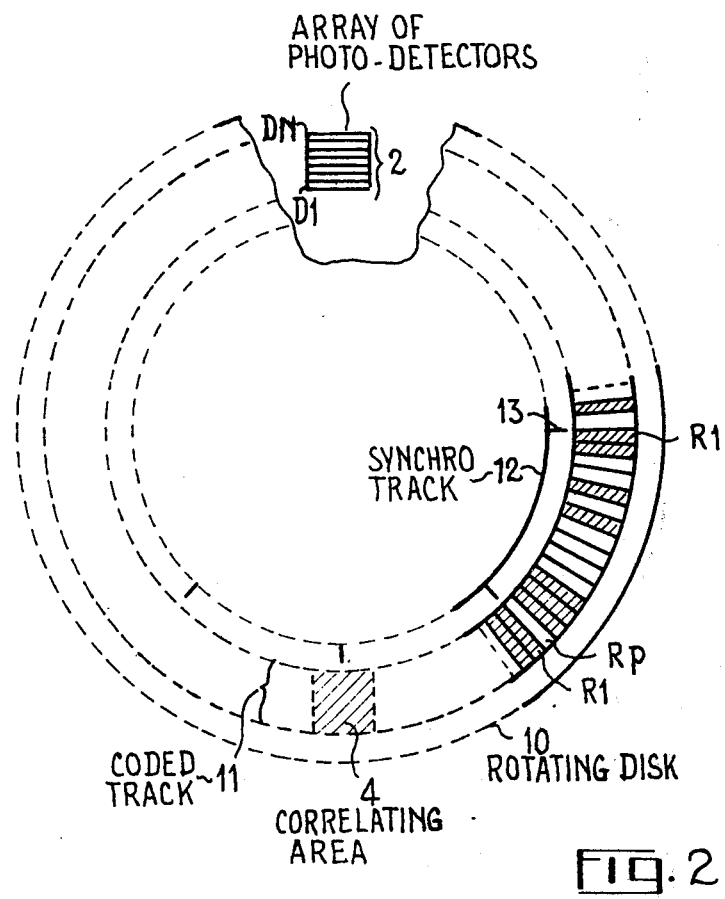
FIG. 2 is a partial view of a code carrier for the system of FIG. 1.

The system thus described exploits the auto-correlation properties of a pseudo-random code whose correlation function defines a narrow peak of large amplitude enabling a substantial improvement of the signal-to-noise ratio. The pseudo-random code is reproduced successively over the entire length of the support 3 along the X axis. In the case of a code carrier in the form of a rotating disk 10, as shown in FIG. 2, the coded strip zones are thus distributed around a ring 11, with the complete code $R_1 - R_P$ preferably recurring a whole number of times. The cyclic appearance of the code strip enables continuous operation of the system with improvement of the response characteristics thereof by eliminating the side-lobe levels which occur in a discontinuous representation of the codes. The aforementioned synchronization track 12 comprises a line 13 at the start of each code pattern, the disk 10 of FIG. 2 accommodating exactly eight such mutually identical patterns $R_1 - R_P$. The positions of the detection area 2 and of the correlation area 4 are offset along the ring 11 by a whole number of code lengths and in this embodiment are diametrically opposite each other.

Another embodiment of our improved system for tracking light is schematically shown in FIG. 3. The moving support 3 carries here a plurality N of juxtaposed tracks $P_1$ to $P_N$ each reproducing a pseudo-random code repeated successively, this code being particular to the respective track and different from the codes represented on the N - 1 other tracks. The tracks are arranged in parallel, forming in front of the useful area 2 an array of juxtaposed elementary strips similar to that of the detection area 2 of FIG. 1. The detecting means at the useful area 2 may be constituted by a single detector $D_{11}$ of the same size, or its image may be optically projected onto a detector of smaller size by means, for example, of a plano-convex lens associated with a linear detector or of a planospherical lens associated with a spot detector. In this single-detector system, the discrimination along the Y axis is effected as a function of the particular modulation code conveyed by the signal $S_{11}$. The processor is also simplified, comprising a single circuit $C_{11}$ supplying a single photo-emissive diode $E_{11}$ at the input of the correlator 4 - 7. Reference signals are formed by the codes of the tracks $P_1$ to $P_N$ of the common support 3 moving in front of the correlating area 4 which is so located as to maintain the necessary phase synchronism as previously defined. This result is achieved by a positioning of identical codes of each track at any instant opposite the areas 2 and 4. The azimuth discrimination is effected optically in this system by auto-correlation of the modulated signal $S_{11}$ with the reference track comprising the same code, the spatial positioning of which defines a corresponding elementary strip zone on the screen 7 of camera tube 21 (FIG. 1). The positioning of the correlation peak Q in this strip enables, upon a scanning of the screen, a determination of the spatial co-ordinates, i.e. elevation and azimuth.

A system according to FIG. 3 comprises a simplified treatment device having a single channel, instead of N channels as in FIG. 1, which results in a substantial cost reduction.

A light-source-tracking device according to our invention enables the signal-to-noise ratio to be greatly improved in comparison with prior systems. The rejection of the noise according to the law giving the correlation gain S/B in dB = $10 \log_{10}(2^n - 1)$ reaches for example 18dB when considering a code having 63 bits ($n = 6$). Moreover, the measuring of the azimuth and of the elevation are effected simultaneously, in real time and in a continuous manner.

The linear detectors $D_1 - D_N$ of FIG. 1 and the area detector $D_{11}$ of FIG. 3 have light-responsive elements (such as photocathodes) whose response characteristic is uniform over their entire light-receiving surfaces. Similarly, the linear photoemitters $E_1 - E_N$ of FIG. 1 and the area emitter $E_{11}$ of FIG. 3, when excited, glow with uniform intensity over their entire active surfaces; they may be constituted, for example, by light-emissive diodes. Screen 7 has a significant decay period which results in an integration of the impinging light pulses over one or more code cycles, a code cycle being defined as the time of movement of a complete sequence of elemental areas $R_1 - R_P$ (defining a pseudo-random code pattern) past the objective 1 or 6.

Regarding the striplike or disk-shaped code carriers of FIGS. 1 - 3, reference may be made to commonly owned U.S. Pat. Nos. 3,483,557 and 3,526,893.

We claim:

1. An optical tracking system comprising:
   an optical objective having an axis centered on a field of view;
   a code carrier partly located in a detection area substantially in a focal plane of said objective;
   drive means for continuously moving said code carrier in a direction transverse to said axis, said code carrier being subdivided into a multiplicity of juxtaposed strip zones parallel to its direction of motion, each strip zone forming a pseudo-random binary optical code pattern and at least one replica thereof following one another in said direction, the code patterns of said strip zones being longitudinally coextensive, whereby continuous luminous radiation from a distant target within said field of view is converted into a pulsed light beam, the combined width of said strip zones equaling the width of said detection area transverse to said direction;
   conversion means transforming said pulsed light beam into a train of luminous pulsations in the rhythm of the beam pulses;
   projection means directing said pulsations onto said code carrier in a correlation area of said code carrier having the same dimensions as said detection area, the centers of said detection area and said correlation area being separated in said direction by a whole number of lengths of said code patterns whereby said areas are traversed by correlated optical patterns at each instant; and
   focusing means for projecting light from said correlation area onto a receiving surface.

2. A tracking system as defined in claim 1 wherein said conversion means comprises photoelectric transducer means positioned to receive said pulsed light beam and photoemissive means energizable by said transducer means to generate said pulsations.

3. A tracking system as defined in claim 2, further comprising electric amplifier means between said transducer means and said photoemissive means.

4. A tracking system as defined in claim 2 wherein said transducer means comprises a single detector positioned to receive light from the entire detection area, said photoemissive means comprising a single light emitter positioned to illuminate the entire correlation area, said code patterns of all said strip zones being mutually distinct.

5. A tracking system as defined in claim 4 wherein said code carrier comprises a rotatable disk having said strip zones disposed thereon in concentric rings.

6. A tracking system as defined in claim 1, further comprising an integrating photosensitive screen juxtaposed with said correlation area, said screen constituting said receiving surface.

7. An optical tracking system comprising:
   an optical objective having an axis centered on a field of view;
   a code carrier partly located in a detection area substantially in a focal plane of said objective;

drive means for continuously moving said code carrier in a direction transverse to said axis, said code carrier being subdivided into a multiplicity of juxtaposed strip zones parallel to its direction of motion, each strip zone forming a pseudo-random binary optical code pattern and at least one replica thereof following one another in said direction, the code patterns of said strip zones being longitudinally coextensive, whereby continuous luminous radiation from a distant target within said field of view is converted into a pulsed light beam, the combined width of said strip zones equaling the width of said detection area transverse to said direction;

a multiplicity of linear detectors respectively aligned with said strip zones for receiving said pulsed light beam;

a like multiplicity of linear light emitters respectively energizable by the outputs of said linear detectors for generating a train of luminous pulsations in the rhythm of the beam pulses;

projection means directing said pulsations onto said code carrier in a correlation area of said code carrier having the same dimensions as said detection area, the centers of said detection area and said correlation area being separated in said direction by a whole number of lengths of said code patterns whereby said areas are traversed by correlated optical patterns at each instant; and focusing means for projecting light from said correlation area onto a receiving surface.

* * * * *